United States Patent [19]

Gunnerman

[11] 4,308,033
[45] Dec. 29, 1981

[54] FUEL PELLET AND PROCESS FOR MAKING IT BY SHAPING UNDER PRESSURE AN ORGANIC FIBROUS MATERIAL

[76] Inventor: Rudolf W. Gunnerman, 2800 City View, Eugene, Oreg. 97405

[21] Appl. No.: 200,100

[22] Filed: Oct. 23, 1980

[51] Int. Cl.³ .......................... C10L 5/06; C10L 5/22; C10L 5/44
[52] U.S. Cl. ........................................ 44/6; 44/10 A; 44/10 B; 44/16 F; 44/24
[58] Field of Search .................. 44/10 A, 16 F, 24, 6, 44/10 B

[56] References Cited

U.S. PATENT DOCUMENTS

| | | | |
|---|---|---|---|
| 3,684,465 | 8/1972 | Hsu | 44/16 F |
| 3,726,651 | 4/1973 | Ronden | 44/24 X |
| 4,015,951 | 4/1977 | Gunnerman | 44/10 E |
| 4,230,459 | 10/1980 | Moreau et al. | 44/16 F |
| 4,234,320 | 11/1980 | Verschuur | 44/24 X |

Primary Examiner—Carl F. Dees
Attorney, Agent, or Firm—Stevens, Davis, Miller & Mosher

[57] ABSTRACT

An organic fibrous material such as bagasse, tree bark, sawdust, straw, peat moss, tree twigs and the like is mixed with a waxy material which is compatible with natural waxy substances contained by the organic fibrous material. The mixture is shaped into a substantially symmetrical pellet having a density of at least about 62.5 pounds per cubic foot with a maximum dimension in section of one-half inch or less in a pelletizing mill under an applied pressure whereby the natural waxy substance contained by the organic fibrous material are exuded to the surface of the resulting pellet and mixed with the added waxy materials to form a substantially uniform continuous coating over the surfaces of an organic fibrous core. The coated pellet releases more energy at a faster rate than the uncoated core when burned alone.

17 Claims, 2 Drawing Figures

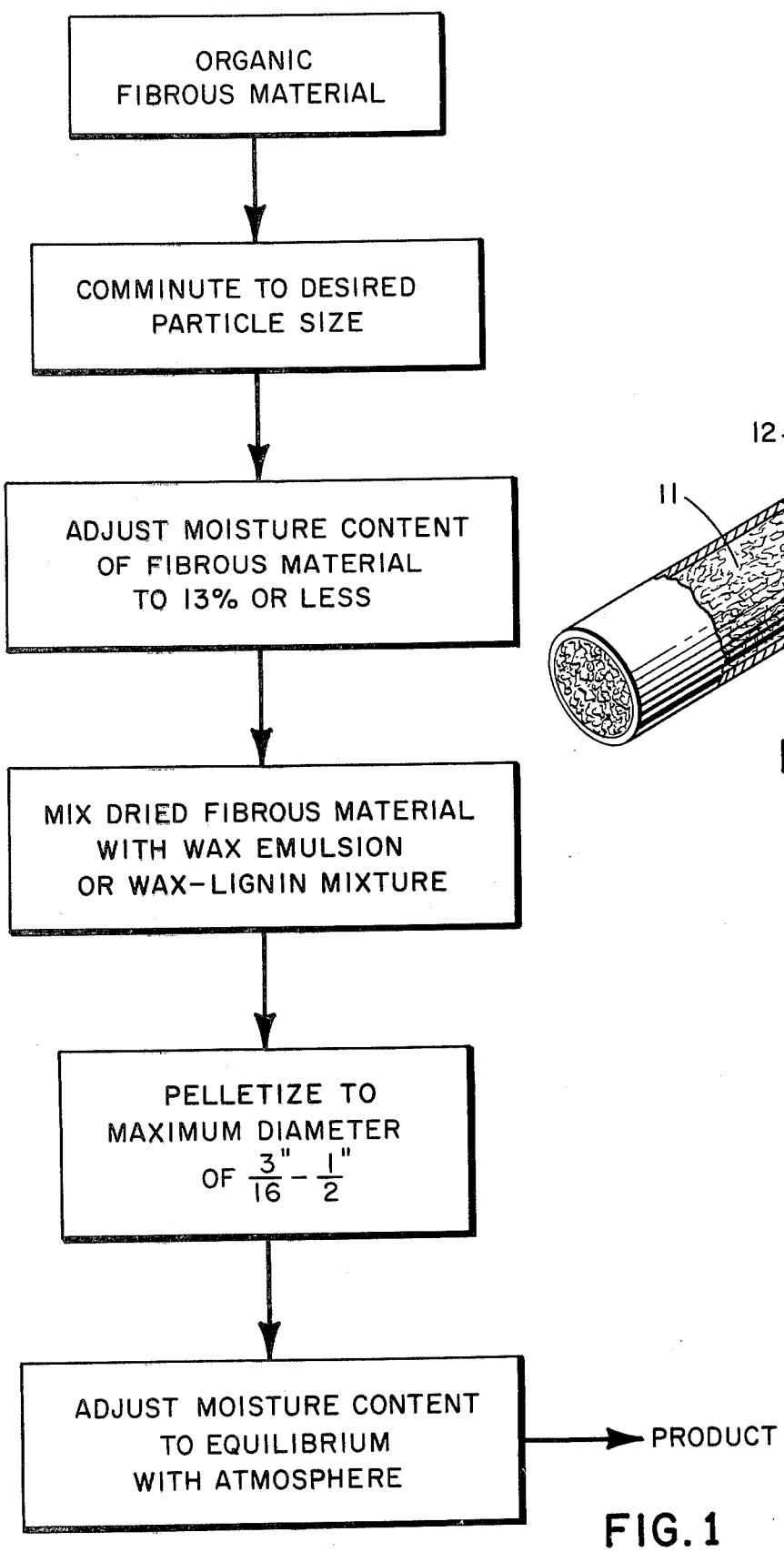

FUEL PELLET AND PROCESS FOR MAKING IT BY SHAPING UNDER PRESSURE AN ORGANIC FIBROUS MATERIAL

This invention relates generally to a novel fuel and, more particularly, to a novel fuel suitable for industrial or household purposes and prepared by shaping organic fibrous material in a die under pressure into pellets which burn efficiently without the formation of significant amounts of incombustible ash. The invention is an improvement over the process and product disclosed in U.S. Pat. No. 4,015,951 issued on Apr. 5, 1977, the disclosure of which is incorporated herein by reference.

As described in the patent, an organic fibrous material is shaped by a pellet mill into substantially symmetrically shaped combustible pellets which release energy as heat of from about 8500–9000 or higher BTU per pound when burned. In accordance with the disclosed process, an organic fibrous material is comminuted if the particle sizes are too large for pelletizing in the dies of a pellet mill, and is shaped into substantially symmetrical pellets at a moisture content of from about 16 percent to about 28 percent by weight at the time it enters the die of the pellet mill. The pressure in the die is such that lignin and other waxy substances contained in the cells of the fibrous lignocellulose material exude to the surface and form a protective wax-like surface on the resulting pellets.

It had been disclosed prior to the invention described in U.S. Pat. No. 4,015,951 in U.S. Forest Service Research Note FPL-090 entitled "Wood Fuel Preparation" by Reinke published by the U.S. Department of Agriculture, Forest Service, Forest Products Laboratory and dated January, 1965 that wood scrap can be used in making fuel pellets. Also, a process for making fire logs from ligno-cellulose particles is disclosed in U.S. Pat. No. 3,227,530 and a process for making tablets from wood powder is disclosed in U.S. Pat. No. 3,492,134. Still other processes for making briquettes or pellets from wood products are disclosed in U.S. Forest Service Research Note FPL-075 entitled "Briquets From Wood Residue" published in November, 1964 by U.S. Dept. of Agriculture, Forest Service, Forest Products Laboratory and U.S. Pat. Nos. 43,112; 959,870; 1,102,591; 2,475,769 and 4,211,740. While the process disclosed in U.S. Pat. No. 4,015,951 is an improvement over the other disclosed processes, the production rate of a pelletizing mill must be limited to avoid excessive power consumption and to insure that substantially smooth surfaced pellets are formed without excessive crumbling.

It is therefore an object of the invention to provide a process for pelletizing organic fibrous material which is devoid of the foregoing disadvantages. Another object of the invention is to provide a novel fuel pellet containing an organic fibrous material having improved burning characteristics. Still another object of the invention is to provide a method for improving lubrication of a pelletizing die in which an organic fibrous material is compressed to form a fuel pellet. A more specific object of the invention is to provide an improved process for shaping in a die under pressure an organic fibrous material into a pellet having improved burning characteristics which can be burned in furnaces designed for burning natural gas, oil or coal without substantial modification of the furnace. A still further object of the invention is to provide a process for pelletizing an organic fibrous material to form a fuel pellet of improved density with a reduction in dusting or crumbling of the compressed fibrous material. Another more specific object of the invention is to provide a process for pelletizing an organic fibrous material at an increased production rate with improved pelletizing mill performance and reduced power consumption.

Other objects will become apparent from the following description with reference to the accompanying drawing wherein FIG. 1 is a flow sheet showing the sequence of steps of one embodiment of the process of the invention; and FIG. 2 is a perspective view with parts broken away illustrating one embodiment of the fuel pellet provided by the invention.

The foregoing objects and others are accomplished in accordance with this invention, generally speaking, by providing a process for shaping under pressure an organic fibrous material into a pellet having a density of at least about 62.5 pounds per cubic foot coated with a mixture of naturally occurring substances which have been exuded from the fibrous material during pelletizing and a similar substance which is compatible therewith and joins with the naturally occurring substances to form a substantially uniform waxy coating over the surfaces of the pellets which substantially encloses a core of organic fibrous material from which naturally occurring substances have been exuded. The invention thus provides novel pellets having a core of organic fibrous material containing reduced amounts of waxy materials and a coating of natural occurring substances supplemented with a wax, lignin or other waxy material which is compatible with the exuded naturally occurring substances. The pellets are combustible substantially symmetrically shaped pellets having a density of at least about 62.5 pounds per cubic foot. The thus produced pellets ignite and burn more rapidly releasing energy at a faster rate than pellets similarly produced but without the added substances. It has been found that organic fibrous material mixed with a wax and water emulsion can be pelletized in a pellet mill at an increased production rate with a lower power consumption and with reduced dusting of the fibrous material than similar organic fibrous material which is not treated in accordance with this invention. The organic fibrous material may be mixed with a source of lignin as well as with wax to supplement the exuded natural substances to form a coating on the surfaces of the pellets.

In a preferred embodiment of the process of the invention a stabilized wax-in-water emulsion and a suitable surfactant or wetting agent to improve the wetting of the surfaces of the organic fibrous material with the exuded and added wax are applied prior to pelletizing to a suitably sized organic fibrous material. A preferred surfactant is one sold commercially as "Light Water" for application of a coating of foam on an airport runway to be used for landing by an airplane having trouble with its landing gear. The "Light Water" may be mixed with the organic fibrous material by spraying, pouring or the like on a particulate organic fibrous material. The "Light Water" foams on the surface of the particles to facilitate wetting of the particulate organic fibrous material with the added wax and the exuded substances to form a substantially continuous uniform coating over the surface of the resulting pellet.

The invention contemplates fuel pellets made from any vegetable matter as distinguished from animal and minerals in the form of organic fibrous material which can be shaped into a pellet under pressure such as, for example, ground wood bark, hog fuel, bagasse, sawdust, twigs, wood shavings, or other waste materials obtained by processing trees, agricultural waste materials such as plant stalks, husks, straw leaves, peanut hulls, peat moss, bagasse, scrap lumber or any other suitable vegetable material which is a source of a shapeable biomass material having a particle size which adapts it for pressing in a die or is capable of being comminuted to such a dimension.

Any suitable wax or similar high molecular weight hydrocarbon such as, for example, tallow, paraffin wax, carnauba wax, beeswax, or the like may be used. It is preferred to add the wax as an emulsion in water to facilitate the formation of a thin uniform flow of the wax on the pellet at a temperature at which the wax is soft of say 20° C. or higher. One suitable wax is a wax in water emulsion sold as "Cascowax EW 4034" by the Borden Company of Columbus, Ohio.

One suitable source of lignin is waste liquor from the digestion of wood to separate the lignin from cellulose such as "black liquor" discharged from a commercial alkaline cook of wood in a cellulose purification process. A commercial product sold under the trade name "Lignisite" by Georgia Pacific Company of San Francisco, Calif. has been found to be a suitable source of lignin for supplementing substances exuded from organic fibrous material to form the improved coating on fuel pellets in accordance with the invention.

The moisture content of the organic fibrous material at the time of pelletizing is to be adjusted, if necessary, to from about 14% to about 28% by weight at the time of pelletizing. When the supplemental materials are added in aqueous solution or emulsion the moisture content of the organic fibrous material can be reduced sufficiently before addition to compensate for the moisture added so the total moisture of the organic fibrous material during pelletizing is within the desired range after addition of aqueous supplement. Alternately, the aqueous supplemental material may be added to the organic fibrous material while it is at a moisture content whereby the moisture content after the addition is above 28% in which case the organic fibrous material is dried to a point within the correct range for pelletizing. In one embodiment of the process, the moisture content of fibrous organic material is reduced with hot air to about 13 percent by weight before the supplemental lignin and/or wax are added. Sufficient black liquor and wax emulsion are mixed with the fibrous material to increase the moisture content to about 16% to 28% by weight.

When the organic fibrous material at ambient temperature is pelletized at a pressure required to produce pellets having a density of at least about 62.5 pounds per cubic foot in a pellet mill of the type available from California Pellet Mill Company of San Francisco, Calif., the temperature of the resulting pellet increases to from about 260° F. to 425° F. as a result of the kinetic energy of compression of the particulate material.

The lignin, waxes and other naturally occuring substances contained in the pellets are volatilized or burn along with the cellulose in the pellets to release energy and to leave little if any ash behind, so the pellets are substantially completely burned. Black liquor available from a paper mill may be too viscous and/or too gummy for use without dilution. Under such circumstances, water is mixed with the black liquor until the viscosity is such that it can be sprayed with a conventional spray nozzle and the water content of the diluted black liquor is about 50% by weight based on the total weight of the resulting mixture. The black liquor or other additive material is mixed with the organic fibrous material in a ratio to increase the total lignin and waxes by about 10% by weight over the natural content thereof.

Referring now to FIG. 1, one embodiment of the process of the invention is illustrated by flow sheet. An organic fibrous material such as tree bark of random particle size is ground in a hammer mill to a particle size having a cross-sectional dimension of not substantially greater than one-half inch in cross-section. The fibrous material is conveyed longitudinally through a rotating substantially cylindrical hot air dryer to reduce its moisture content to about 13% by weight. About 45 gal of a wax-in-water emulsion prepared by mixing about 2 ounces of powdered "Light Water" (perfluoronated octanoic acid) surfactant, 10 gallons of "Cascowax EW 403" wax-in-water emulsion containing about 40%–45% by weight paraffin wax, about 0.1% bacteria, and the balance water and having a pH of 7.8 are mixed substantially uniformly at a rate of ½ gal. per minute to the ground tree bark used to produce 5½ to 6 tons of pellets per hour. The moisture content of the fibrous material is adjusted to about 16% by weight based on the weight of the ground tree bark. The resulting ground tree bark with its adjusted moisture content is charged to a pellet mill of the type sold by the California Pellet Mill Company of San Francisco, Calif. where it is pressed into dies having the desired configuration and dimensions to a density of about 62.5 pounds or higher per cubic foot. Under the applied pressure, naturally occurring waxy substances contained in the tree bark particles exude to the surface and mix with the wax which has been mixed with the particles prior to pelletizing.

The pellets emerging from the pellet mill are spread over a rotating endless belt conveyor where fans blow air over them to adjust the temperature and moisture content thereof to approximately ambient. The product having the substantially uniform moisture content may then be stored safely or used immediately if desired. The equilibrium moisture content of the pellets will usually be within the range of from about 7 to 12% depending upon the humidity in the atmosphere.

A substantially symmetrical cylindrical pellet 10, having a core of compressed tree bark particles 11 and a waxy surface coating 12 having the composition obtained from the mixture containing Caso wax and "Light Water" described above is illustrated in FIG. 2.

In an experiment which extended over a period of about 24 hours at an average pellet production rate of about 5 tons pellets per hour from a mixture of hog fuel, shavings and sawdust (about 50% by weight cedar and 50% by weight fir) the average power consumption for producing pellets in accordance with the embodiment described herein with reference to FIG. 1 was about 290 amperes with a RPM of about 2000. The average power requirements for pelletizing the same type of organic fibrous material at a production rate of 3.5 to 4 tons per hour is about 300 amperes.

Although the invention has been described in detail for the purpose of illustration, it is to be understood that such detail is solely for that purpose and variations can be made therein without departing from the spirit and scope of the invention except as it is limited by the claims.

What is claimed is:

1. In a process for making fuel pellets from organic fibrous material which comprises shaping an organic fibrous material under pressure in a pelletizing die under conditions whereby natural substances which are contained in the said material are exuded to form a protective surface coating on the surface of the resulting pellet, the improvement which comprises mixing with the said organic fibrous material prior to pelletizing a waxy material which is compatible with said exuded substances and combines with the exuded substances on the surface of the resulting pellet to substantially enclose an organic fibrous core.

2. The process of claim 1 wherein the said waxy material is a wax and is added to the organic fibrous material as a wax-in-water emulsion.

3. The process of claim 1 wherein lignin dispersed in water is mixed with the mixture of organic fibrous material.

4. The process of claim 1 wherein an aqueous surfactant is mixed with the organic fibrous material to improve wetting of the surfaces of the organic fibrous material by the exuded substances and by the wax mixed with the organic fibrous material prior to pelletizing.

5. The process of claim 1, 2, 3 or 4 wherein the temperature of the organic fibrous material is at least 20° C. and the waxy material mixed therewith fuses at the temperature in the die as the organic fibrous material is shaped.

6. The process of claim 1, 2, 3 or 4 wherein an aqueous perfluorinated carboxylic acid or sulfonic acid wetting agent is mixed with the organic fibrous material to improve wetting thereof by the exuded and added waxy materials.

7. A combustible compressed organic fibrous pellet having a substantially symmetrical configuration with a maximum dimension in cross-section of not more than about one-half inch, a density of at least 62.5 pounds per cubic foot and a substantially smooth surface coating comprising a mixture of natural substances exuded from the organic fibrous material and a waxy material compatible with the exuded substances, said pellet being adapted to burn substantially uniformly to release energy at a faster rate than the same organic fibrous material without the surface coating.

8. A substantially symmetrical, combustible pellet comprising a compressed organic fibrous material core having a density of at least about 62.5 pounds per cubic foot and an adherent surface coating substantially enclosing said core and comprising naturally occurring substances exuded from the organic fibrous core as the core was shaped under pressure and a waxy material which is compatible with said exuded substances.

9. The pellet of claim 8 wherein the said surface coating contains lignin.

10. The pellet of claim 8 or 9 which releases when burned energy at a faster rate than energy is released by the core alone when burned.

11. The pellet of claim 8 wherein the waxy material is a wax.

12. The pellet of claim 11 wherein the waxy material is a paraffin wax.

13. The process of claim 1 wherein the waxy material is a paraffin wax.

14. In a process for making fuel pellets from a compressible combustible material comprising organic fibrous material containing natural occurring substances which exude therefrom under pressure and a moisture content of about 16% to about 28% by weight which process comprises pelletizing said combustible material in a die to form a substantially symmetrical fuel pellet having a density of at least about 62.5 pounds per cubic foot and a maximum dimension in section of one-half inch under a pressure which exudes said substances to the surface of the pellet, the improvement which comprises mixing with the combustible material a substance which is compatible with said naturally occurring substance and combines with the naturally occurring substance to reduce dusting of the combustible material from the die and to lubricate the combustible material as it is shaped under pressure, and pelletizing the resulting mixture.

15. The process of claim 14, wherein said substance mixed with the combustible material comprises lignin.

16. The process of claim 14, wherein said substance mixed with the combustible material comprises a wax.

17. The process of claim 14, wherein said substance mixed with the combustible material comprises both a wax and lignin.

* * * * *

Notice of Adverse Decision in Interference

In Interference No. 101,139, involving Patent No. 4,308,033, R. W. Gunnerman, FUEL PELLET AND PROCESS FOR MAKING IT BY SHAPING UNDER PRESSURE AN ORGANIC FIBROUS MATERIAL, final judgment adverse to the patentee was rendered Jan. 17, 1986, as to claims 1-4, 7-9 and 11-17.

[*Official Gazette April 1, 1986.*]